United States Patent [19]

Fair

[11] 4,143,736
[45] Mar. 13, 1979

[54] SEISMIC TRANSDUCER CONSTRUCTION

[75] Inventor: Delbert W. Fair, Ponca City, Okla.

[73] Assignee: Continental Oil Company, Ponca City, Okla.

[21] Appl. No.: 848,224

[22] Filed: Nov. 3, 1977

[51] Int. Cl.² .............................................. G01V 1/14
[52] U.S. Cl. ............................ 181/119; 340/15.5 SW
[58] Field of Search ............... 181/113, 114, 119, 121; 340/15.5 SW, 17; 73/665; 404/117; 91/217, 216 B, 411 B; 92/146

[56] References Cited

U.S. PATENT DOCUMENTS

| | | | |
|---|---|---|---|
| 3,159,233 | 12/1964 | Clynch et al. | 181/401 |
| 3,287,696 | 11/1966 | Cholet | 181/121 |
| 3,745,885 | 7/1973 | Fair et al. | 181/119 |
| 3,789,951 | 2/1974 | Silverman | 181/114 |
| 3,860,087 | 1/1975 | Silverman | 181/114 |
| 3,983,957 | 10/1976 | Silverman | 181/114 |

Primary Examiner—Nelson Moskowitz
Attorney, Agent, or Firm—William J. Miller

[57] ABSTRACT

The present invention relates to a seismic transducer for generating waves in an elastic medium and is particularly applicable to the generation of low frequency shear waves. The transducer is comprised of a mass member having more than one parallel hydraulic cylinder disposed therein, a piston member disposed in each cylinder, each piston member including a piston and a pair of oppositely extending rods, and a frame interconnecting the ends of the piston rods which frame has a base surface thereon for engaging a surface of the elastic medium in energy coupling relationship. A system of hydraulic fluid bleed-back ports associated with the piston members serve to aid lubrication and keep high pressures off of the rod end seals. The present construction permits total enclosure of the mass member and plural piston member assembly.

14 Claims, 4 Drawing Figures

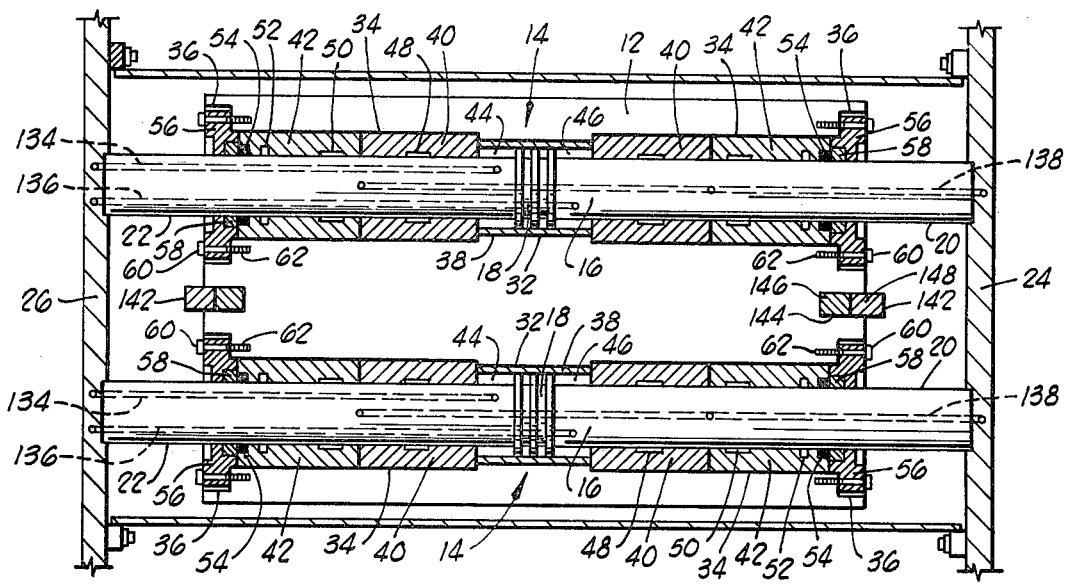
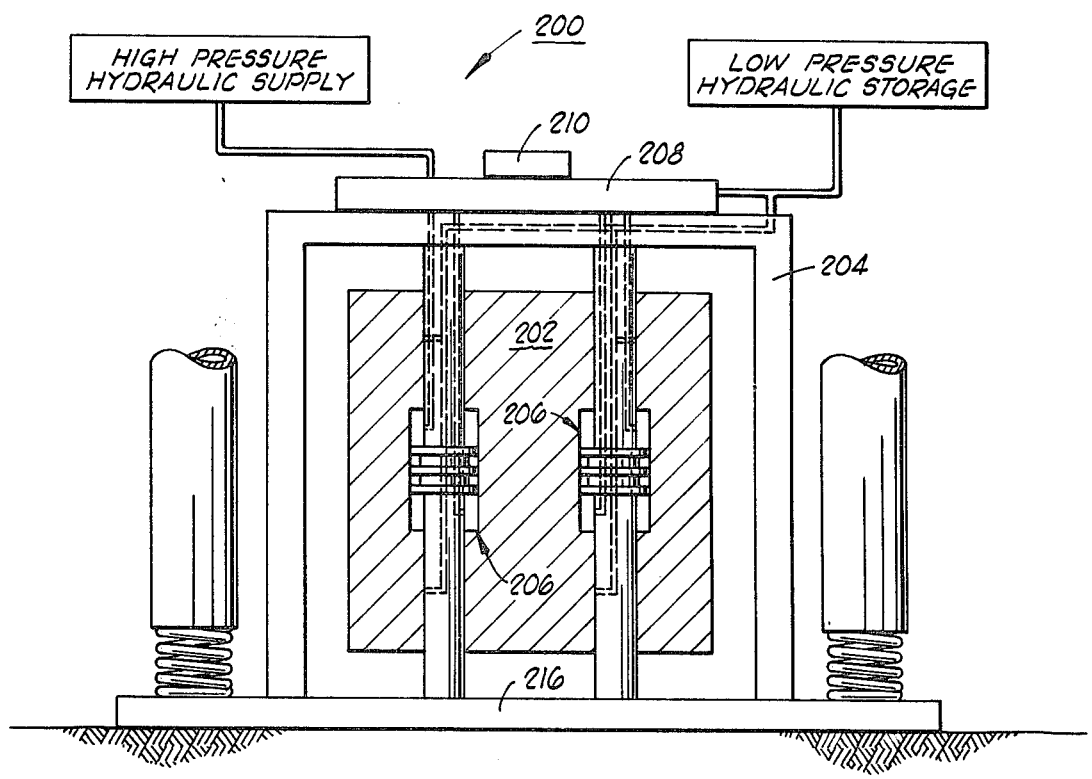

SEISMIC TRANSDUCER CONSTRUCTION

BACKGROUND OF THE INVENTION

1. Field of the Invention

The present invention relates generally to transducers for inducing vibrational signals in an elastic medium, and more particularly, but not by way of limitation, it relates to an improved construction for a transducer especially suitable for generating seismic shear waves in the earth for the purpose of seismographic surveying.

2. Description of the Prior Art

When practicing the system of vibrational seismographic exploration disclosed generally in U.S. Pat. No. 2,688,124 issued to Doty et al. on Aug. 31, 1954, a seismic signal of controlled frequency must be induced in the earth. The controlled signal then propagates downwardly and is reflected from subterranean interfaces upwardly and recorded as a composite signal having a plurality of the reflected controlled signals at various time phase positions on the record. The composite record is then correlated with the original transmitted signal to produce highly valuable seismic data.

A prior art transducer of general type is shown in U.S. Pat. No. 3,159,233 issued to Clynch et al. on Dec. 1, 1964. In general, such a transducer is comprised of a mass member having a cylinder bore extending therethrough, a piston member having a piston and oppositely extending rods reciprocally disposed in the cylinder bore, and means for introducing fluid under pressure to the cylinder bore causing reciprocation of the piston member relative to the mass member. These specific types of prior transducers had a particular problem that was inherent in the design; the problem was primarily concerned with the tendency of the mass member to rotate about the piston.

Prior art attempts at plural vibrator assemblies is particularly characterized by U.S. Pat. No. 3,777,843 as issued Dec. 11, 1973 in the name of Fair et al. and entitled "Seismic Vibrator System." This system utilized two separate vibrators earth-coupled through a single, unitary base plate in an attempt to better distribute vibrational forces over the whole of the base plate; however, systems such as this proved to be difficult to synchronize and subsequently were relegated to limited usage.

SUMMARY OF THE INVENTION

The present invention relates to a seismic transducer for generating waves in an elastic medium and is particularly applicable to the generation of low frequency shear waves. The transducer is comprised of a mass member having more than one parallel hydraulic cylinder disposed therein, a piston member disposed in each cylinder, each piston member including a piston and a pair of oppositely extending rods, and a frame interconnecting the ends of the piston rods, the frame having a base surface thereon for engaging a surface of the elastic medium. Disposed within the piston members and the frame is a series of ports through which high pressure hydraulic fluid is communicated to the cylinders in such a manner as to cause a simultaneous reciprocation of the piston members relative to the mass member.

Therefore, it is a general object of the present invention to provide a seismic transducer construction which is particularly applicable to the generation of shear waves.

Another object is to provide a seismic transducer construction which produces signals of lower frequency and of greater strength than can be produced by previously known shear wave transducers.

Yet another object of the present invention is to provide a transducer in which there is no tendency of the mass member to rotate about the piston member, whether used as a pressure wave or shear wave transducer.

A still further object is to provide a shear wave transducer construction which permits the cylinder center line to be located more closely to the surface of the elastic medium thereby to decrease the distance through which the frame must transmit the shear forces and also to reduce lateral rocking motion during operation.

Yet a further object is to provide a pressure wave seismic transducer construction which more evenly distributes the generated forces across the base plate that couples the energy into the earth.

Finally, it is an object to provide a basic transducer component which may be operated in either the vertical or horizontal position, with but minor structural modification, to generate either pressure waves or shear waves, respectively.

Many additional objects and advantages of the present invention will be evident to those skilled in the art from the following detailed description and drawings.

BRIEF DESCRIPTION OF THE DRAWINGS

FIG. 2 is a top view in section of the end plates, piston members and mass member of a seismic transducer using plural hydraulic drive elements such as that of FIG. 1;

FIG. 4 is a schematic side elevational view of a pressure (P) wave vibrator constructed in accordance with the present invention showing the center portion in section to illustrate details of construction.

DETAILED DESCRIPTION OF THE PREFERRED EMBODIMENTS

Figure 1:
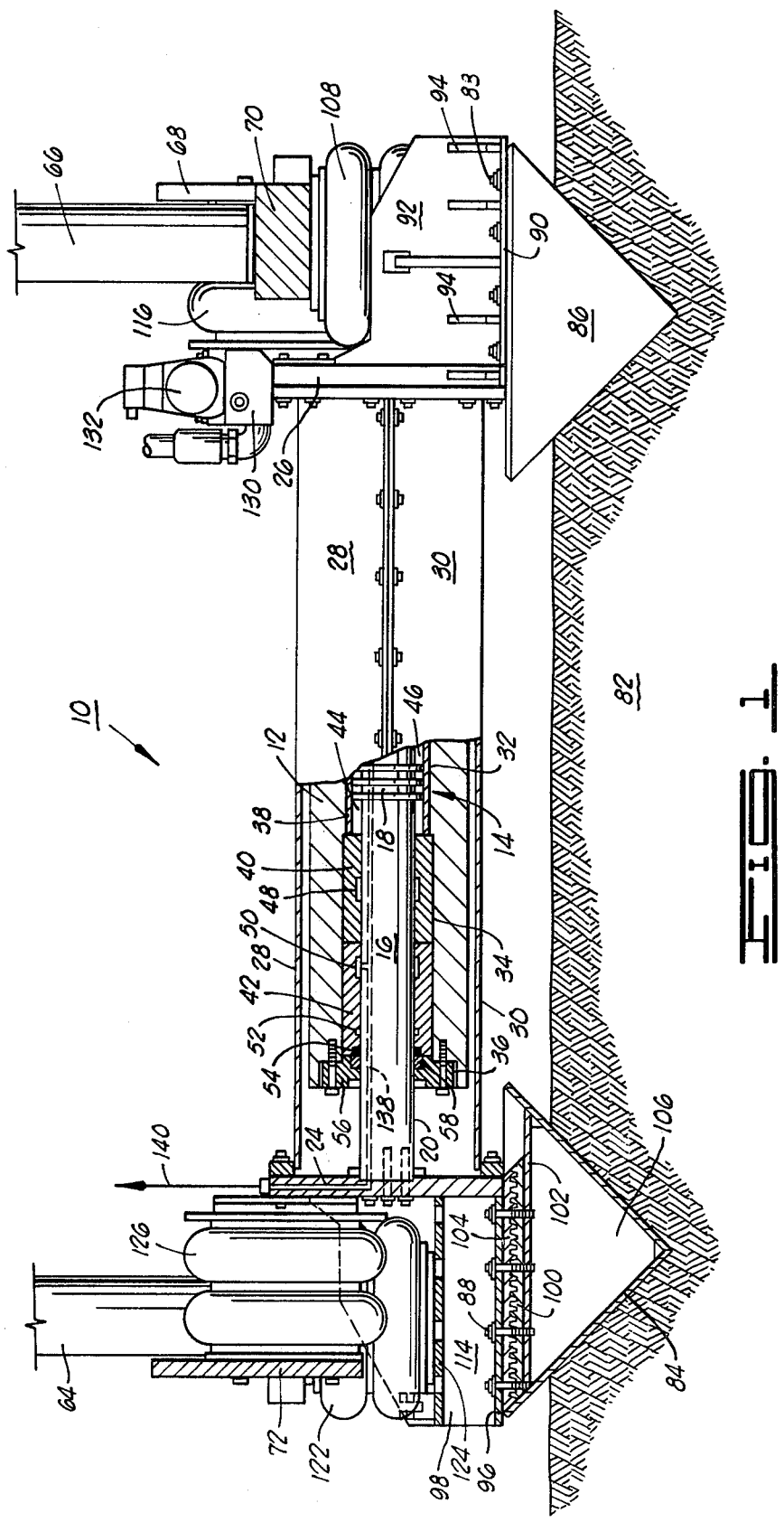
FIG. 1 is a front elevational view of a seismic transducer for generating seismic shear waves as constructed in accordance with the present invention, and as shown in partial cut-away schematic section to illustrate internal details of construction.

Referring now to the drawings, and in particular to FIGS. 1 and 2, a shear wave transducer constructed in accordance with the present invention is indicated generally by the reference numeral 10. The transducer 10 is comprised of a reaction mass member, indicated generally by the reference numeral 12, as formed by casting or forging from high density metal. A pair of cylinder bores, each indicated by the reference numeral 14, extend through the reaction mass member 12 and a piston member 16 is reciprocally disposed within each such cylinder bore 14. Each piston member 16 is comprised of a piston 18 and opposite extending rods 20 and 22. A rigid frame, consisting of end plates 24 and 26 and upper and lower closure members 28 and 30, interconnects the ends of the rods 20 and 22 which protrude from the cylinder bores 14, as will be further described.

More specifically, the reaction mass member 12 is comprised of a mass block fabricated of a suitable material such as steel and having a desired cross-section, e.g., rectangular. The mass member 12 has two cylindrical bores 32 extending longitudinally therethrough with a first counterbore 34 and a second counterbore 36 in each end of each of the bores 32. A tubular cylinder sleeve 38 is disposed in each of the bores 32 and extends from the bottom of one counterbore 34 to the bottom of the opposite counterbore 34. The interior wall of each of the tubular cylinder sleeves 38 forms one of the cylinder bores 14 in which one of the pistons 18 is reciprocally disposed, and an inner bronze bearing insert 40 and an outer bronze bearing insert 42 are disposed within each of the one or more counterbores 34 to slidingly receive the piston rods 20 and 22, and also to form the ends of the hydraulic cylinders and thereby form fluid chambers 44 and 46 on either side of each of the pistons 18. The internal diameters of the bearing inserts 40 and 42 are provided with a plurality of small annular oil grooves which reduce the flow of hydraulic fluid from the high pressure in the cylinders to the low pressure returns. Additionally, each of the inner bearing inerts 40 has a relatively large inner fluid collecting groove 48, and each of the outer bearing inserts 42 has relatively large center and outer fluid collecting grooves 50 and 52 disposed within its internal diameter. Disposed within the internal diameter adjacent the outer face of each of the outer bearing inserts 42 is a groove seating resilient seal means 54. The particular sealing and pressure return structure forms no part of the present invention and is claimed in a co-pending application, Ser. No. 848,164 filed concurrently herewith.

A cylinder end cap 56 is disposed within each of the one or more counterbores 36, around each of the piston rods 20 and 22, retaining each of the outer bearing inserts 42. Each of the end caps 56 has disposed within its inner face an end cap seal back of bushing 58, and each of the end caps 56 is held in place by a plurality of suitable high torque bolts 60 extending through the end cap into appropriately threaded bores 62 in the mass member 12.

Figure 3:
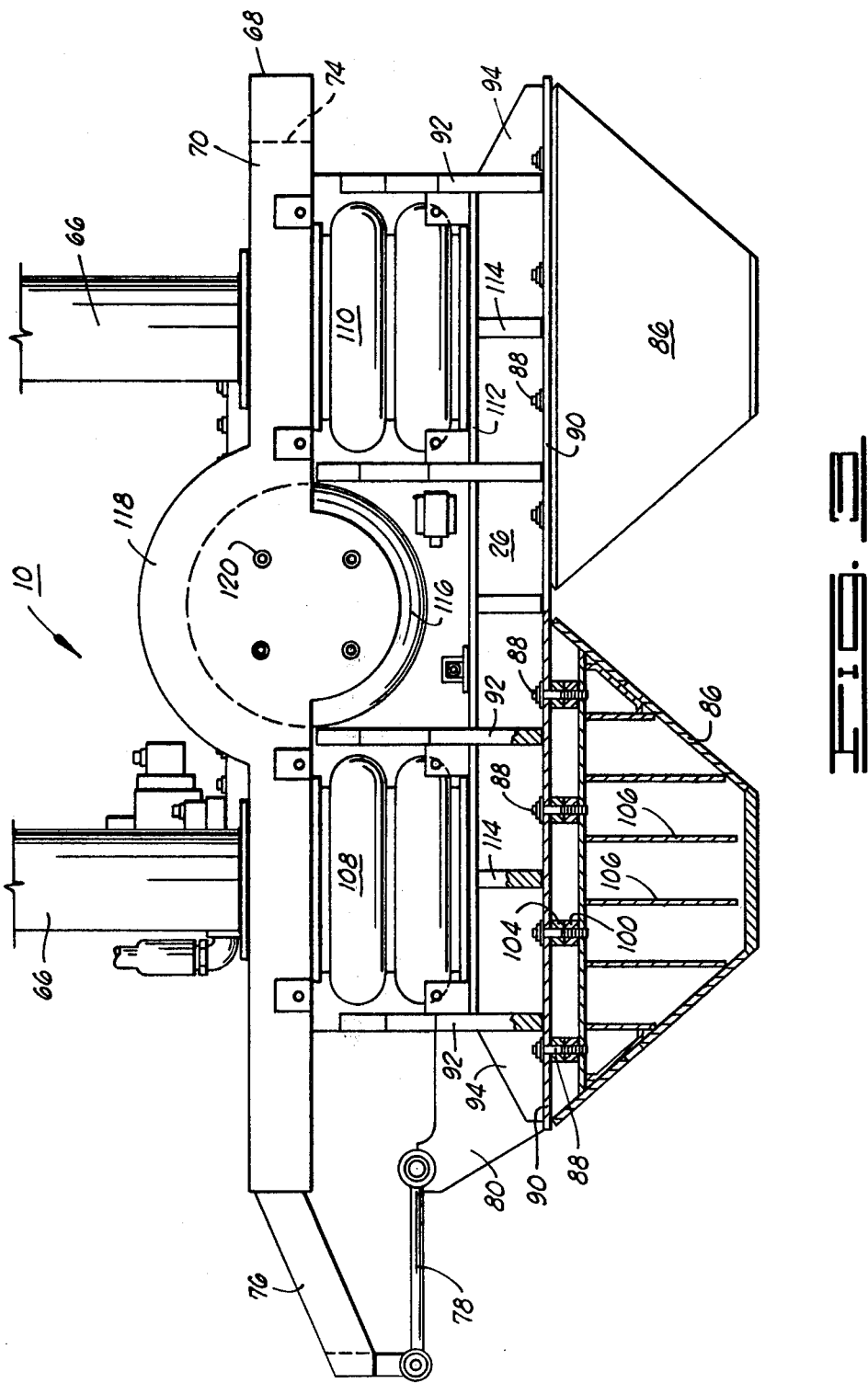
FIG. 3 is a side elevational view of the shear wave transducer of FIG. 1.

As shown in FIGS. 1 and 3, the vibrator 10 is supported in conventional manner beneath a truck carrier or the like by means of opposite side pairs of vertical guide rods 64 and 66. As shown in FIG. 3, the opposite side guide rods 64 and 66 extend vertically in parallel where they are suitably reinforced and drivably interconnected to the truck carrier frame for controlled extension thereby to allow the truck weight to be supported on guide rod pairs 64 and 66 as an aid in energy coupling during vibration operation. The manner and specifics of vibrator suspension from truck carriers, either rear mounted or center mounted, is well documented in the prior art, particularly the U.S. Pat. Nos. 3,777,843; 3,372,770; and 3,306,391.

On one side, the vertical guide rod 66 extends down into rigid affixure with a support shoe bar 70 supporting one side of vehicle carrier in vibrationally damped manner, as will be described. On the opposite side, guide rods 64 extend down into rigid affixure with a support shoe bar 72 supporting that side of vehicle carrier in damped manner. As can be noted from FIG. 3, the support shoe 68 extends completely around the vibrator unit 10 in generally rectangular shape as opposite shoe bars 70 and 72 extend around the front and rear by bars 74. A shoe extension bar 76 serves to support pivotally connected radius rods 78 which serve for affixure on brace members 80 when the vibrator 10 is in its operational position. This maintains truck fore and aft position on air bags and relative to base plates.

Each side of the vibrator 10 is coupled to the earth by means of a pair of inverted, generally pyramidal cleat members 84 and 86. The particular cleat array as shown in FIGS. 1 and 3 also differs in structure and function from the prior art which is best characterized by the U.S. Pat. No. 3,159,232. In departure, the cleat structure of FIGS. 1 and 3 varies in several aspects including the angle and shape of adjacent faces of the pyramidal cleats, as well as the method of support from base plate or frame structure, and this structure is more particularly described and claimed in the co-pending U.S. application Ser. No. 848,222, filed concurrently herewith.

Thus, the cleat members 86 (FIG. 3) are secured by a plurality of bolts 88 to a base plate 90 secured as by welding to end plate 26. The base plate/end frame structure is reinforced in all directions by means of a plurality of transverse angle brackets or gusset plates 92 as weld-affixed in support, and a plurality of gusseting angle plates 94 welded across the front and rear edges of base plate 90.

The identical construction is used on the other side of vibrator 10 in the securing of cleat members 84 to a base plate 96 by means of a plurality of bolts 88. Base plate 96 is again welded at right angles to opposite end plate 24 with transverse reinforcement provided by weld-affixed angle plate 98 and forward and rear angle brackets 94. Cleats 84 are provided with toothed bars 100, a plurality in parallel array, as welded on a support plate 102 of cleat member 84, and these are formed for mating engagement with a like plurality of toothed bars 104 welded to the underside of base plate 96 thereafter to be secured by bolts 88 in suitably placed bores. The internal portion of cleat member 84 includes a plurality of parallel arrayed stiffener plates 106 as aligned in transverse orientation to vibrator 10. The manner of securing to the base plate 90 and the internal structure of the opposite side of cleat members 86 is identical to that of the members 84.

The vibrator 10 is actually supported from the end plates 24 and 26 as rigidly secured to cleat members 84 and 86, and vibration damping coupling is provided with respect to the upper support members or guide rods 64 and 66. Thus, and referring particularly to FIG. 3, vertical support is provided by air springs 108 and 110 as secured beneath the underside of shoe bar 70 and a support plate 112 which is welded in parallel alignment over base plate 90 and supported by plural, parallel weld-affixed insert plates 114. The upper and lower portions of air springs 108 and 110 are secured to their respective receiving services by means of bolts (not shown) in conventional manner. The particular air springs 108 and 110 utilized are those known as the double convolution type, a well-known type that is commercially available from the Industrial Rubber Products Division of Firestone Rubber Company, Noblesville, Indiana. Lateral resilient support is then afforded by a horizontal air spring 116 which is secured between a central arcuate portion 118 of support shoe bar 70 by the conventional affixure with bolts 120, and the remaining end is affixed to the outer surface of end plate 26 thereby completing the two degrees of vibrationally damped suspension. The opposite end of vibrator 10 is supported in identical manner with a pair of vertical air springs 122 as affixed between support shoe bar 72 and support plate 124, and lateral suspension is provided by means of an air spring 126 as secured between support shoe bar 72 and the end plate 24.

Referring again to FIGS. 1 and 2, each of the rods 20 is attached to the end plate 24, and each of the rods 22 is attached to the end plate 26 by a plurality of suitable screws (not shown) extending through the end plates for affixure in appropriately threaded bores in respective rods 20 and 22. Conventional O-ring seal means (not shown) are utilized between the rods 20 and 22 and their respective end plates 24 and 26 in order to provide the requisite fluid-tight pressure seal. A manifold 130 and conventional form of servovalve 132 are mounted on the top of base plate 26 in communication with supporting orifices formed therein for communication with the piston rod ends 22.

As shown in FIG. 2, hydraulic fluid ports 134 and 136 are disposed within piston rod ends 22 in communication with respective chambers 44 and 46. The ports 134 and 136 are similarly in communication with ports through end plate 26 and intercommunication with the paralleling manifold 130 in well-known manner. A hydraulic fluid bleed-back port 138 is disposed within rod ends 20 to provide communication between points adjacent the bearing inserts 40 and 42, and a return port within end plate 24 leading to the low pressure hydraulic storage as shown by arrow 140. (FIG. 1).

Mechanical bumpers 142 (FIG. 2) are utilized to safeguard against shock loading of the end plates on excessive stroke or impulse. Thus, axially aligned bores 144 are formed on each side of mass 12 and the bores then receive a suitable resilient plastic or rubber insert 135 in force fit, with insertion of a metallic bumper piston 148 thereover, e. g., a bronze piston. Suitable retaining collar means may be utilized to insure positioning of bumper piston 148 at all times.

The manner of operation of the transducer 10 is as follows. The high pressure fluid flows from the high pressure hydraulic supply through the manifold 130 and servovalve 132 in controlled alternation to each pair of the ports 134 and 136. The stable center position of the piston member relative to the mass member is maintained by feedback from a conventional linear transformer mounted between the reaction mass 12 and the frame 26 in a manner similar to that shown in U.S. Pat. No. 3,159,233 to Clynch et al., such linear transformer (LVDT) being well-known in the art. The high pressure fluid then flows through the ports 134 to the chambers 44, and through the ports 136 to the chambers 46 in alternation. When high pressure fluid is flowing to the chambers 44, the chambers 46 are then communicated through the ports 136, manifold 130, the servovalve 132, and back through the manifold 130 to the low pressure hydraulic storage. When high pressure fluid is flowing to the opposed chambers 46, the chambers 44 are similarly communicated with the low pressure hydraulic storage through the ports 134, manifold 130 and servovalve 132. In this manner, when the high pressure fluid is diverted to the chambers 44, the mass member 12 moves to the left relative to the piston members 16, and then alternately, when the high pressure fluid is diverted to the chambers 46, the mass member moves back to the right.

All of the necessary porting is disposed within the two or more piston members 16 and the end frames 24 and 26, and all parallel manifolding and valving is attached directly to the end frames. There is no porting within the mass member 12, therefore there are no hydraulic or electrical connections to the mass member. This permits the mass member 12 to be totally enclosed, thereby preventing dirt and other foreign matter from contacting the moving parts. Such total enclosure is effected by the upper and lower cover plates 28 and 30.

Referring now to FIG. 4, another embodiment of the present invention is indicated generally by the reference numeral 200. The transducer 200 is used for generating seismic compressional waves. It employs a reaction mass member 202, a frame 204, a pair of piston members 206, a manifold 208, and a servovalve 210, all of which inter-relate in a manner similar to that of the analogous components of the transducer 10. The piston members 206 contain porting similar to that of the transducer 10, except that it is more convenient in the embodiment of the transducer 200 to have all three of the ports exit the piston members at the upper end.

In its operation the transducer 200 is analogous to the transducer 10, with the exception that for the pressure wave transducer 200, the construction of the coupling plate 216 may be different from that of a coupling plate for a shear wave transducer. The details of construction of hold down means and coupling plates for pressure wave transducers are known to the art, as is shown, for example, by U.S. Pat. No. 3,159,233 to Clynch et al. and U.S. Pat. No. 3,159,232 to Fair.

While the present invention is particularly described utilizing two parallel disposed hydraulic cylinder assemblies, it should be understood that it is well contemplated to use greater multiples of such hydraulic drive elements as aligned within the reaction mass. The use of more than two cylinder/piston elements will greatly enhance the ability to design larger, more stable seismic energy vibrators capable of greater frequency control and reliability.

The use of multiple hydraulic drive cylinders in pressure (P) wave vibrators has proven an advantage in enabling better distribution of force along the entire base plate. Thus, the prior art problems of concentrating forces at the center of the base plate, and thus causing extreme flexing, can be obviated, e.g., by utilizing a plurality of parallel aligned drive cylinders within a single mass and spaced across the associated base plate.

Thus, the seismic transducer of the present invention is well adapted to carry out the objects and attain the ends and advantages mentioned, as well as those inherent therein. While presently preferred embodiments of the invention have been described for the purpose of this disclosure, numerous changes in the construction and arrangement of parts can be made by those skilled in the art, which changes are encompassed within the spirit and scope of this invention as defined by the appended claims.

What is claimed is:

1. A transducer for inducing waves in an elastic medium, comprising:
   a single mass member having a plurality of parallel offset cylinder bores extending therethrough;
   a piston member having a piston and oppositely extending piston rods reciprocally disposed in each cylinder bore and each rod extends out each side of said mass,
   means for simultaneously introducing fluid under pressure into each cylinder bore, alternately on opposite sides of each piston, and concurrently on the same sides of the several pistons, for simultaneously reciprocating the piston members in concert, relative to the mass member; and
   a frame interconnecting the ends of the oppositely extending piston rods, the frame having means thereon for engaging a surface of the elastic medium.

2. A transducer for inducing waves in an elastic medium as defined in claim 1 wherein:
the means on the frame for engaging the surface of the elastic medium is disposed generally parallel with the oppositely extending piston rods,
whereby upon reciprocation of the piston members relative to the mass member the frame will be reciprocated by a reaction force in a direction parallel to the surface of the elastic medium to couple shear waves into the elastic medium.

3. A transducer for inducing waves in an elastic medium as defined in claim 1 wherein:
the means on the frame for engaging the surface of the elastic medium is disposed generally perpendicular to the oppositely extending piston rods,
whereby upon reciprocation of the piston members relative to the mass member the frame will be reciprocated by a reaction force in a direction generally normal to the surface of the elastic medium to couple compressional waves into the elastic medium.

4. A transducer for inducing waves in an elastic medium such as the earth including a hydraulic fluid system having a high pressure side and a low pressure side, said transducers comprising:
a reaction mass member having a plurality of cylinder bores extending therethrough;
a piston member having a piston and oppositely extending piston rods reciprocally disposed in each of said cylinder bores;
means disposed within each of said piston members for introducing fluid under pressure from said high pressure side into each of said cylinder bores alternately on opposite sides of said pistons for reciprocating said piston members relative to said mass member; and
a frame interconnecting the ends of the oppositely extending piston rods, said frame having a surface thereon for engaging a surface of the elastic medium.

5. A transducer for inducing waves in an elastic medium as defined in claim 4 wherein:
the surface on the frame for engaging the surface of the elastic medium is disposed generally perpendicularly to the oppositely extending piston rods,
whereby upon reciprocation of the piston member relative to the mass member the frame will be reciprocated by a reaction force in a direction normal to the surface of the elastic medium and compressional waves will be induced in the elastic medium.

6. A transducer for inducing waves in an elastic medium as defined in claim 4 wherein:
the surface on the frame for engaging the surface of the elastic medium is disposed generally parallel with the oppositely extending piston rods,
whereby upon reciprocation of the piston member relative to the mass member the frame will be reciprocated by a reaction force in a direction parallel to the surface of the elastic medium and shear waves will be induced in the elastic medium.

7. The transducer of claim 5 which further comprises:
a bearing insert disposed within each end of the cylinder bore to slidingly receive one of the piston rods, each of said bearing inserts having disposed within its inner diameter, a fluid collecting groove to collect that fluid which flows between the cylinder bore and the piston rods; and
wherein the frame is further characterized as including a base plate and a first and second end plate, between which is mounted a side piston member, said first end plate having disposed therein a return port means for communicating the fluid bleed-back means with the low pressure side of said hydraulic system.

8. The transducer of claim 6 which further comprises:
a bearing insert disposed within each end of the cylinder bore to slidingly receive one of the piston rods, each of said bearing inserts having disposed within its inner diameter, a fluid collecting groove to collect that fluid which flows between the cylinder bore and the piston rods; and
wherein the frame is further characterized as including a base plate and a first and second end plate, between which is mounted said piston member, said first end plate having disposed therein a return port means for communicating the fluid bleed-back means with the low pressure side of said hydraulic system.

9. The transducer of claim 8 further comprising:
a manifold and conventional servovalve mounted on the frame; and
wherein the frame is further characterized as including a base plate and a pair of end plates, between which is mounted the piston member, one end plate having disposed therein a pair of ports each of which communicate with one of the fluid power ports of the piston member and also with the manifold, so that fluid under pressure is directed by the servovalve through the manifold, the ports within the frame and the fluid power ports in an alternating fashion to the opposite sides of the piston for reciprocating the piston member relative to the mass member.

10. A transducer for inducing waves in an elastic medium such as the earth, comprising:
a mass member having a plurality of cylinder bores extending therethrough, and having at each end of each cylinder bore a first and second counterbore;
a piston member having a piston and oppositely extending piston rods, reciprocally disposed in each cylinder bore with the rods extending from each end of the cylinder bore;
a bearing insert disposed within each of the first counterbores to slidingly receive one of the piston rods, and form the end of a fluid cylinder;
a cylinder end cap disposed within each of the second counterbores, around the piston rod, behind the bearing insert, the end caps being connected to the mass member to hold the bearing inserts in place;
a frame interconnecting the ends of the oppositely extending piston rods, the frame having a surface thereon for engaging a surface of the elastic medium; and
port means, disposed within the piston members and the frame, communicating the cylinder bores with a manifold and servovalve, for introducing fluid under pressure into the cylinder bores, alternately on opposite sides of each piston, and concurrently on the same sides of the several pistons, for simultaneously reciprocating the piston members in concert, relative to the mass member.

11. A transducer as set forth in claim 10 which is further characterized to include:

bumper means of resilient construction disposed in axial alignment on each end of said mass member and in contacting attitude to said frame.

12. A transducer for inducing seismic energy waves in an elastic medium such as the earth, comprising:
   a single mass member having two offset parallel aligned cylinder bores extending therethrough;
   first and second piston members each having oppositely extending piston rod ends, said piston members being reciprocally disposed in said two cylinder bores to extend respective rod ends out each side of said mass;
   frame means of unitary structure to rigidly support both rod ends of said first and second piston members, and including a base plate for earth engaging coupling; and
   means for hydraulically reciprocating said first and second piston members relative to said mass member in synchronism to generate an alternating reaction force for earth coupling and propagation as seismic energy waves.

13. A transducer as set forth in claim 12 wherein:
   said alternating reaction force is parallel to the earth's surface to generate shear waves.

14. A transducer as set forth in claim 12 wherein:
   said mass member is reciprocated on said parallel-disposed first and second piston member to the elimination of any rotational forces on said mass member.

* * * * *